United States Patent [19]
Fabian et al.

[11] Patent Number: 4,459,233
[45] Date of Patent: Jul. 10, 1984

[54] PURIFICATION OF CRUDE ORGANIC PIGMENTS

[75] Inventors: Wolfgang Fabian, Wilhelmsfeld; Rüdolf Polster, Frankenthal, both of Fed. Rep. of Germany

[73] Assignee: BASF Aktiengesellschaft, Ludwigshafen, Fed. Rep. of Germany

[21] Appl. No.: 363,889

[22] Filed: Mar. 31, 1982

[30] Foreign Application Priority Data

Apr. 13, 1981 [DE] Fed. Rep. of Germany ....... 3114928

[51] Int. Cl.$^3$ ............................................. C09B 47/04
[52] U.S. Cl. .................. 260/245.86; 544/74; 546/31; 546/167; 548/416
[58] Field of Search ..................... 260/245.86; 546/31; 546/167; 548/416; 544/74

[56] References Cited

U.S. PATENT DOCUMENTS 3,523,030 8/1970 Malin et al. ................. 260/245.87 X
4,239,685 12/1980 Pigasse ....................... 260/245.87 X Primary Examiner—Richard Raymond
Attorney, Agent, or Firm—Oblon, Fisher, Spivak, McClelland & Maier

[57] ABSTRACT

A process for purifying crude organic pigments, wherein the crude pigment is suspended in a mixture of two organic liquids which are partially or completely immiscible with one another, the suspension is mixed at 50°–180° C. until equilibrium has been reached, the phases are allowed to separate, the phase containing the impurities (i.e. the first liquid) is separated off and the purified pigment is isolated from the other phase (i.e. the second liquid).

Finely divided crude pigments can, directly after purification, be converted, while in the second liquid, into pigmentary forms.

The process gives pigments of high purity, which after conversion into pigmentary forms give deep, brilliant colorations.

15 Claims, No Drawings

PURIFICATION OF CRUDE ORGANIC PIGMENTS

The present invention relates to a process for the purification of crude organic pigments.

Since the crude pigments obtained by synthesis contain a greater or lesser proportion of by-products or impurities, which interfere with the use of the pigments, the crude products are in many cases subjected to special purification procedures, for example washing or boiling them with one or more solvents which dissolve the impurities efficiently, or milling them in the presence of such solvents, or dissolving them in suitable liquids, such as concentrated sulfuric acid, oleum or chlorosulfonic acid, and fractionally precipitating them from such solutions.

The first two processes have the disadvantage that impurities included in the crystals are not dissolved out completely, if at all. Fractional precipitation from concentrated sulfuric acid has the disadvantages that losses are very high and that, for ecological reasons, the sulfuric acid produced must be worked up again.

It is an object of the present invention to provide a process for the purification of crude pigments which gives very pure pigments without entailing the disadvantages of the prior art purification processes.

We have found that this object is achieved by a process for the purification of a crude organic pigment wherein the crude pigment is suspended in a mixture of two organic liquids which are partially or completely immiscible with one another, the suspension is mixed at 50°–180° C. until equilibrium has been reached, the phases are allowed to separate, the phase containing the impurities (ie. the first liquid) is separated off and the purified pigment is isolated from the other phase (ie. the second liquid).

The process gives pigments of high purity, which after conversion into pigmentary forms give deep, brilliant colorations. The novel process does not pollute the environment, since the organic liquids employed can, after working up, be re-used.

The result is surprising since it was known to a skilled worker that boiling contaminated coarse-crystalline crude pigments as a rule does not achieve adequate purification. On the other hand, digesting finely divided crude pigments in organic solvents as a rule gives extremely fine suspensions which cannot be filtered.

The novel process has further advantages. When it is applied to finely divided agglomerated crude pigments, it allows these to be purified and, at the same time or subsequently, to be converted, while in the second liquid, into pigmentary forms, so that purification and finishing can be combined.

Where a pigment is synthesized in an organic solvent, the crude pigment obtained can be purified direct, in the suspension obtained from the synthesis (but, where necessary, after concentrating this suspension), by adding another liquid which is partially or completely immiscible with that contained in the suspension; intermediate isolation and drying are not needed.

In general, the process is carried out by introducing the crude pigment either into one of the liquids or into a mixture of the first and second liquids, in the former case adding the other liquid which is partially or completely immiscible with the first liquid, either direct or after heating the suspension to 50°–180° C., heating the entire mixture to 50°–180° C. and keeping it at the chosen temperature until equilibrium has been reached. When the phases have separated, the phase containing the first liquid and the impurities is separated off and the purified pigment is isolated from the second liquid. If desired, the purification can be repeated, in which case the separated-off phase is replaced by pure first liquid.

The heterogeneous mixture of the liquids consists advantageously of a polar hydrophilic organic liquid (the first liquid) which is miscible with water in all proportions, and a non-polar or polar organic liquid (the second liquid) which is immiscible with water and is partially or completely immiscible with the first liquid.

In the treatment of contaminated pigments where the liquid mixture is to be used according to the invention, the impurities go into the first liquid and the pigment into the second liquid, so that after phase separation the two constituents can easily be separated from one another.

Examples of suitable first liquids, ie. polar hydrophilic organic liquids which are miscible with water in all proportions, are formic acid, ethylene glycol, diethylene glycol, polyols with 3, 4 or 5 hydroxyl groups, eg. glycerol, as well as ethanolamine or mixtures of the above.

For economic reasons, diethylene glycol and especially formic acid, glycerol and ethylene glycol are preferred as the first liquid.

Suitable second liquids, ie. water-immiscible, non-polar or polar organic liquids, are benzene hydrocarbons, nitrobenzenes, chlorobenzenes, aliphatic and cycloaliphatic hydrocarbons and aliphatic chlorohydrocarbons and bromohydrocarbons.

Specific examples of suitable second liquids are benzene, toluene, the xylenes, n- and i-propylbenzene, n- and i-butylbenzene, chlorobenzene, dichlorobenzene, trichlorobenzene, the chlorotoluenes, nitrobenzene, nitrotoluene, pentane, hexane, heptane, octane, decane, petroleum ether, cyclohexane, chloroform, carbon tetrachloride, 1,2-dichloroethane, trichloroethylene, dichloroethylene, tetrachloroethylene and 1,2-dibromoethane. Mixtures of these liquids may also be used as the second liquid.

Preferred pairings of first and second liquids are formic acid, glycerol or ethylene glycol for the former, and aromatic hydrocarbons, aromatic chlorohydrocarbons, cyclohexane, aliphatic hydrocarbons and aliphatic chlorohydrocarbons or bromohydrocarbons, eg. benzene, toluene, xylene, butylbenzene, chlorobenzene, cyclohexane, hexane, heptane, octane, chloroform, carbon tetrachloride, 1,2-dichloroethane, trichloroethylene, tetrachloroethylene and 1,2-dibromoethane, for the latter.

Xylene, tetrachloroethylene, trichloroethylene and 1,2-dibromoethane are preferred as the second liquid.

Particularly preferred pairings of organic liquids, which give especially good purification, are the following mixtures: ethylene glycol/p-xylene or xylene mixtures, ethylene glycol/tetrachloroethylene, ethylene glycol/trichloroethylene, ethylene glycol/1,2-dibromoethane, formic acid/p-xylene or xylene mixtures and formic acid/tetrachloroethylene.

The amounts of first and second liquid can be varied within wide limits. The minimum amounts are determined by the need for the mixture to be thoroughly miscible with the crude pigment and for each phase to be coherent after phase separation.

The weight ratio of first liquid to crude pigment is advantageously from 0.5 to 2.5, preferably from 0.8 to 1.5.

The weight ratio of second liquid to crude pigment is as a rule from 0.5 to 5, preferably from 0.5 to 1.5.

Preferably, purification is effected by first heating the mixture of crude pigment and first liquid to the desired temperature and, after from about 30 minutes to several hours, adding the second liquid at the same temperature, with stirring, whereupon the suspension separates into two phases.

Thus, using crude copper phthalocyanine and a mixture of ethylene glycol and xylene, a copper phthalocyanine/xylene paste is obtained as one phase and a clear greenish yellow to brown ethylene glycol phase as the second.

The glycol phase can easily be separated from the phase containing the crude pigment, for example by draining off through the bottom valve of the stirred kettle. In this way, about 80–90% of the ethylene glycol employed can be removed. For further purification and/or removal of contaminated ethylene glycol, it is possible to charge in further pure ethylene glycol, mix thoroughly and remove the glycol phase, after phase separation, as described above.

If additional purification is desired or necessary, the mixture is again heated after addition of the first liquid, and the latter is separated off after the phases have separated. The procedure can be repeated as often as necessary, until the first liquid is colorless or no longer contains any impurities. The crude pigment can then be isolated from the second liquid, for example by drying, ie. by evaporating the second liquid.

The first liquid which has been separated off can be recovered by distillation, and re-used. The residues from the distillation can be destroyed by incineration. Where appropriate, unconverted starting products, for example copper salts, can be recovered from the residues.

When drying the mixture of purified product and second liquid, the latter can be recovered by condensation, and can be re-used.

Examples of organic crude pigments for which the process according to the invention is suitable are those derived from phthalocyanine, from quinophthalone and from perylene-3,4,9,10-tetracarboxylic acid diimide, from vat dyes based on anthraquinone and its substitution products, from benzanthrone and from dioxazine, as well as azo pigments.

Specific examples are copper phthalocyanines which contain up to 2 chlorine or bromine atoms in the molecule, polychloro-copper phthalocyanine containing up to 50% by weight of chlorine, polybromochloro-copper phthalocyanine containing up to 65% by weight of bromine, tetrachlorophthalimidotetrachloroquinophthalone, perylene-3,4,9,10-tetracarboxylic acid diimides which bear unsubstituted or substituted phenyl, phenylazo or phenalkyl groups on the imide nitrogens, flavanthrone, pyranthrone, chloropyranthrones, chlorobromopyranthrones, bromopyranthrones, tetrabromopyranthrone, dioxazines and Vat Yellow 20, C.I. No. 68,420. Preferably, the process is employed with phthalocyanines.

With finely divided agglomerated crude pigments, where the agglomerates consist of primary particles of $\leq 0.1$ $\mu$m, purification and conversion to the pigmentary form can be carried out as one-vessel processes. In this variant, the agglomerated finely divided crude pigment is preferably first stirred with the warm first liquid, and the warm second liquid is then added, with stirring. When the two phases have separated, the first liquid is removed, the mixture of second liquid and crude pigment is, if necessary, again stirred with pure first liquid, and the first liquid is separated off. After removing any residual first liquid, for example as an azeotropic mixture with the second liquid, the finely divided agglomerated crude pigment, while in the second liquid, is converted to a pigmentary form by hot recrystallization. The pigment can then be isolated in a conventional manner, for example by freeze-drying (if the second liquid used lends itself to this process), or by drying under reduced pressure.

It is also possible to use the process according to the invention to purify a crude pigment obtained from the process of synthesis, without prior drying. To do so, the crude pigment, in the form of a press cake containing organic liquids, is suspended in the first liquid and the other liquids present are removed by heating. If the synthesis of the crude pigment has been carried out in a liquid which can serve as the first or second liquid, the other liquid is added to the warm suspension, and, after equilibrium has been reached and the mixture has been cooled, the first phase, containing the impurities, is separated off. If necessary, purification is repeated until the pigment has the desired purity.

In the present process, it is also possible to start from aqueous suspensions and aqueous press cakes of crude pigments, provided the crude pigment passes into the second liquid when the aqueous composition is stirred and mixed therewith. After the aqueous pigment-free phase has been separated off and, where necessary, after concentration, the first liquid is added and purification is effected as described above.

The Examples which follow, and in which temperatures are in °C. and percentages are by weight, illustrate the novel process.

EXAMPLE 1

100 g of copper phthalocyanine (chlorine content 3.0%; prepared by the baking process from copper-I chloride and phthalodinitrile) were stirred into 100 g of 99% strength formic acid in a 500 ml Erlenmeyer flask, using a magnetic stirrer. The mixture was stirred for one hour at 100° C., 80 g of p-xylene were then run in and after 15 minutes the brown formic acid phase was decanted. It was replaced by an equal volume of ethylene glycol, the batch was mixed warm and the ethylene glycol was separated off. This process was carried out 3 times, after which the xylene paste was dried. 80 g of purified copper phthalocyanine were obtained.

If an equal amount of glycerol is used in place of formic acid, virtually the same success is achieved.

EXAMPLE 2

600 g of an ahydrous paste of hexadecachloro-copper phthalocyanine pigment in p-xylene, containing 33% of pigment (prepared according to German Published Application DAS No. 1,114,462, Example 1), and 200 g of ethylene glycol were stirred for one hour in a 1 liter glass vessel at 130° C. The pale yellow glycol phase was decanted; when it was diluted with water, it gave a yellowish gray precipitate, which was filtered off and isolated in a conventional manner. Addition and separation of glycol were repeated 3 times, until the glycol discharged was virtually colorless. The residual glycol adhering to the xylene pigment paste was then removed by azeotropic distillation, and the glycol-free xylene paste was dried at 1 mm Hg.

190 g of a chemically and tinctorially particularly pure hexadecachloro-copper phthalocyanine pigment were obtained.

EXAMPLE 3

(a) 500 g of finely divided agglomerated copper phthalocyanine (chlorine content 3%; prepared from o-phthalodinitrile and copper-I chloride by the baking process, followed by 36 hours' milling in a ball mill with iron balls) and 600 g of ethylene glycol were stirred for one hour at 100° C. in a 2 liter stainless steel kettle provided with an anchor stirrer and a distillation attachment with phase separation device and 1 liter receiver. 750 g of p-xylene were run into the suspension with constant stirring. After one hour's stirring at 100° C., the stirrer was switched off and the bottom valve was opened. About 450 g of yellowish brown glycol drained off (where necessary, the valve hole was poked clear with an iron wire). 500 g of fresh glycol were added, the mixture was stirred for 60 minutes at 100° C., the stirrer was switched off and the bottom valve was opened. About 500 g of paler glycol drained off. An amount of ethylene glycol equal to that of the first liquid drained off was added and the process of stirring, draining and replacing the glycol was repeated once more, after which the glycol which drained off was virtually colorless. The xylene/CuPc mixture was then heated to its boiling point of 135° C. and heating was continued, with removal of residual glycol, until 138° C., the boiling point of p-xylene, was reached, which required 1–2 hours. The mixture was then stirred for a further 10 hours at 135°–138° C., the stirrer was switched off and the product was dried by gradually applying reduced pressure and heating at an external temperature of 170° C. The xylene vapors were cooled in a condenser and collected in the receiver. After 10 hours, the final pressure being 50–150 mbar, air was admitted into the apparatus. If a sample of the product is not odorless, pumping out and admission of air are repeated several times, until no odor remains.

Yield: 465 g of a pale blue, low-dusting copper phthalocyanine pigment, which contained 50–70% of the $\alpha$-modification, the remainder of the material being the $\beta$-modification. In a surface coating, the product gave deep, pure colorations; it was superior to pigmentary forms obtained from the same crude product by swelling in sulfuric acid, in respect of color strength, purity of hue and dispersibility, the hue being somewhat greener.

(b) The procedure described under (a) was followed, but in place of ethylene glycol the same amount of a 2% strength solution of anhydrous ammonia in ethylene glycol was used. In this case, 485 g of copper phthalocyanine containing 40–50% of the $\alpha$-modification (the remainder being the $\beta$-modification) were obtained. In its tinctorial properties, the pigment was virtually the same as that obtained according to (a).

(c) If the pigment, after conditioning, was isolated from the glycol-free paste of (a) or (b) by freeze-drying, the product obtained was very easily dispersible.

EXAMPLE 4

50 g of copper phthalocyanine (prepared from phthalodinitrile and copper powder by the baking process) and 70 g of ethylene glycol were stirred for 1 hour with a magnetic stirrer in a 500 ml Erlenmeyer flask in an oilbath at 100° C. 75 g of xylene isomer mixture were then added, stirring was continued for 30 minutes and the brownish glycol phase which separated out was decanted. 75 g of fresh glycol were then added, stirring was continued for 15 minutes and the glycol phase was decanted. This process was repeated 3 times with fresh glycol, after which the glycol decanted was virtually colorless. The blue pasty mass was poured onto a drying tray and dried. 45 g of pure copper phthalocyanine were obtained; this material can be converted, by conventional conditioning processes, into tinctorially useful pigments which are in the $\alpha$- or $\beta$-modification.

EXAMPLE 5

500 g of the copper phthalocyanine used in Example 3 and 600 g of ethylene glycol were stirred for 2 hours at 100° C. in the apparatus described in Example 1. 750 g of tetrachloroethylene were added, the mixture was stirred for one hour at 110° C., the bottom valve was opened and the glycol phase was allowed to drain off; about 500 g of yellowish green glycol phase were obtained. 300 g of glycol were then added, the mixture was stirred for 15 minutes and the glycol was drained off. This process was repeated twice more. 750 g of tetrachloroethylene were then added and the mixture was stirred for 16 hours at 115° C. The residual glycol was then removed at 115°–120° C. and the contents of the kettle were evaporated to dryness by applying reduced pressure and heating in oil at 140° C. Yield: 470 g of copper phthalocyanine (chlorine content 3%), of which about 70% was in the $\alpha$-modification.

When an equal amount of dichloroethane was used in place of tetrachloroethylene, and the process was carried out at 60° C., pure copper phthalocyanine, of which more than 70% was in the $\alpha$-modification, was obtained.

EXAMPLE 6

200 g of the copper phthalocyanine used in Example 3 and 400 g of 99% pure formic acid were stirred in a 1 liter glass vessel for 20 hours at 90° C. 200 g of ethylene glycol and 300 g of p-xylene were then run in successively, stirring was continued for 1 hour at 100° C. and the ethylene glycol/formic acid phase which had separated out was siphoned off. Addition and removal of ethylene glycol were repeated until the glycol phase had a pH of 5. The residual glycol was then removed and the contents of the vessel were dried by evaporating off the xylene at 170° C. bath temperature. Yield: 180 g of a copper phthalocyanine (chlorine content 3%) which showed a deep, pure hue and of which more than 75% consisted of the $\alpha$-modification.

As an alternative, the glycol phase could equally well be removed from the mixture by decanting.

EXAMPLE 7

200 g of finely divided agglomerated crude copper phthalocyanine (prepared from o-phthalodinitrile and copper powder by the baking process, and milled for 36 hours in a ball mill with iron balls; the product consists of agglomerates of primary particles of size 0.03–0.1 μm) were introduced into 200 g of glycol in a 1 liter stirred vessel and the mixture was stirred for 1 hour at 140° C. When it had cooled to 80° C., 400 g of trichloroethylene were stirred in, and the mixture was then stirred for 1 hour at 80° C. The bluish yellow glycol phase was decanted and replaced by fresh glycol. This process was repeated twice more, after which the glycol phase was virtually colorless.

The suspension remaining in the vessel was worked up as follows:

The vessel was filled with water and heated; when 70° C. was reached, the water was decanted. This process was repeated twice. Sufficient water was then added to the mixture of copper phthalocyanine and second liquid to enable it to be stirred, and the batch was kept under reflux for 10 hours, with a temperature of 80° C. in the vessel. The trichloroethylene was then distilled off as an azeotrope at 79° C., and the pigment paste, which was moist with water, was dried. Yield: 186 g of a chemically pure copper phthalocyanine pigment of which 48% was in the β-modification.

EXAMPLE 8

500 g of o-phthalodinitrile, 55 g of copper powder, 0.3 g of molybdic acid anhydride and 1,900 g of nitrobenzene, in a 2 liter stirred pressure vessel equipped with an anchor stirrer, were heated uniformly to 200° C. in the course of 3 hours under an ammonia atmosphere (ammonia being passed over the mixture), and were then kept at this temperature for 10 hours. Nitrobenzene was then distilled off by gradual application of reduced pressure, and when the pressure had reached 50 mbar the residue was evaporated to dryness. The stirrer was switched off when 1,000 g of nitrobenzene had passed over. 750 g of xylene and 500 g of ethylene glycol were added successively, at 130° C., to the dry residue, and the mixture was then stirred again. After 2 hours' stirring at 130° C., a two-phase mixture had formed. The liquid glycol phase was drained off and replaced by an equal amount of pure ethylene glycol. The mixture was stirred for 30 minutes at 130° C. and the glycol was again drained off. This process repeated once more. The glycol remaining in the vessel was then removed by azeotropic distillation. As soon as the boiling point of pure xylene had been reached, the stirrer was switched off and the contents of the vessel were evaporated to dryness, at 140° C. bath temperature, by applying reduced pressure; the product was then kept under reduced pressure until a sample was odorless, which was the case after 10 hours. 502 g of a chemically pure β-copper phthalocyanine were obtained.

EXAMPLE 9

300 g of o-phthalodinitrile, 35 g of copper powder, 0.3 g of molybdic acid anhydride and 450 g of ethylene glycol were introduced into a 2 liter stainless steel stirred kettle equipped with an anchor stirrer, and were saturated with ammonia gas in the course of 2 hours at 70° C. The supply of ammonia was then stopped. The mixture was heated uniformly to 140° C. in the course of 2 hours, at 10° C. intervals, and was kept at 140° C. until evolution of ammonia gas had ceased, which was the case after about 3 hours. 300 g of p-xylene were then run in, the mixture was stirred for 1 hour at 130° C. and the brownish glycol phase was drained off through the bottom valve (small amounts of entrained xylene/CuPc mixture could be separated off on a coarse screen and be returned into the stirred kettle). About 300 g of glycol phase drained off. 300 g of fresh glycol were introduced into the kettle, the mixture was stirred for 15 minutes at 130° C. the stirrer was switched off and the glycol was again drained off. The process was repeated until the glycol which drained off was virtually colorless, which was the case after 2 rinsing sequences.

The residual glycol adhering to the surface of the copper phthalocyanine/xylene paste was then distilled off as an azeotrope at 135° C., the xylene phase being returned to the kettle. As soon as the boiling point of pure p-xylene, namely 138° C., had been reached, the stirrer was switched off and, with the heating bath at 170° C., reduced pressure was applied to an extent which allowed the p-xylene vapors to liquefy on the condenser surface. The greater part of the p-xylene, 60–80%, was evaporated in this way. When the reduced pressure had reached the full suction of a waterpump, the product was kept at 150° C. for a further 6–10 hours, until a sample was odorless.

Yield: 303 g of β-copper phthalocyanine in the form of loose granules.

EXAMPLE 10

400 g of a crude pigment of the formula

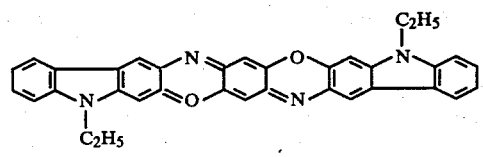

were milled for 36 hours in a 4 liter vibratory mill with 8 kg of iron balls of diameter 2–2.5 cm.

30 g of the milled product, 60 g of p-xylene and 90 g of glycol were stirred in a 500 ml Erlenmeyer flask for 2 hours in an oilbath at 100° C. A deep dark blue pigment/xylene paste and a reddish dark violet glycol phase formed. The latter was decanted through a coarse screen (the entrained pigment paste could be taken off the screen with a spatula and be returned to the flask). 100 g of fresh glycol were added, the mixture was stirred for 20 minutes at 100° C. and the glycol was again decanted. The glycol wash was repeated 3 times, after which the glycol showed only a pale violet color. The pigment/xylene paste was dried at 1 mm Hg. Yield: 29 g of a violet pigment, in a highly scattering, particularly bluish and very easily dispersible pigmentary form.

EXAMPLE 11

400 g of conventionally prepared coarse-crystalline crude 3,4,9,10-perylenetetracarboxylic acid bis-3,5-dimethylanilide were milled in a ball mill as described in Example 10.

40 g of the milled product and 60 g of p-xylene were heated in a 500 ml Erlenmeyer flask, equipped with a powerful magnetic stirrer, for one hour at 120° C., resulting in formation of a viscous red pigment paste which could just still be stirred. 80 g of glycol were added, and the mixture was kept at 120° C. for one hour, with slow stirring. A reddish brown glycol phase with a red fluoroescence, and a xylene/pigment granule mixture, formed.

The glycol phase was decanted through a screen and replaced by fresh glycol, and this process was repeated until the glycol phase was virtually colorless. The mixture was then topped up with water, the water was decanted and the glycol-free pigment granules were finally emptied into a dish and dried.

38 g of 3,4,9,10-tetracarboxylic acid bis-3,5-dimethylanilide were obtained in a high-hiding, slightly scattering, particularly plasticizer-fast and easily dispersible pigmentary form.

EXAMPLE 12

40 g of perylene-3,4,9,10-tetracarboxylic acid bisphenetidide, which had been milled as described in Example 1 of German Published Application DAS No. 2,545,701, and 80 g of o-dichlorobenzene were stirred by means of a magnetic stirrer in a 500 ml Erlenmeyer flask for one hour at 120° C., resulting in formation of a viscous paste which could just still be stirred. 80 g of glycol were added and the mixture was stirred slowly for 1 hour at 120° C. About 50 g of a brownish red slightly fluorescent glycol phase were decanted, and replaced by an equal amount of fresh glycol. This procedure was repeated twice more at intervals of one hour, after which the glycol retained only a pale color. Residual glycol was washed out by repeatedly flushing the pigment/dichlorobenzene paste with water, and finally the paste was dried under reduced pressure at 100° C. 38 g of 3,4,9,10-perylenetetracarboxylic acid bis-phenetidide were obtained in a high-hiding pigmentary form.

EXAMPLE 13

380 g of a crude pigment of the formula

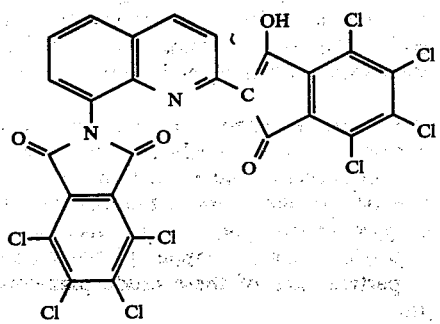

(prepared according to German Pat. No. 1,770,960; purity 90–95%) and 20 g of anhydrous potassium carbonate were milled for 10 hours in a vibratory mill, as described in Example 10.

100 g of the milled material, 150 g of p-xylene and 1.5 liters of water were stirred for 5 hours at 92° C. in a conical 2 liter stainless steel autoclave. The yellow aqueous alkaline phase was drained off through the bottom valve and was replaced by an equal amount of fresh water. The process was repeated until the water which drained off reacted neutral. Thereafter, the residual water was removed by azeotropic distillation. 200 g of glycol were added to the residue, and the mixture was stirred at 120° C. for 3 hours. The yellowish brown glycol phase was drained off and fresh glycol was added. The process was repeated 3 times, after which the glycol which drained off was virtually colorless. The residual glycol was removed by azeotropic distillation at 134°–138° C. and the xylene paste was dried at a heating bath temperature of 140°–170° C., under 50 mm Hg, with the stirrer switched off. 90 g of a chemically pure, tinctorially and technologically useful yellow pigment having excellent solvent fastness and plasticizer fastness were obtained.

EXAMPLE 14

(a) 400 g of crude flavanthrone were milled in a 4 liter vibratory mill with 8 kg of iron balls of diameter 2-2.5 cm.

(b) 40 g of the milled product (a), 60 g of p-xylene and 60 g of glycol were heated evenly to 120° C. in the course of 2 hours, with stirring. A reddish yellow pigment/xylene paste and a reddish glycol phase formed. The glycol phase was decanted and replaced by 100 g of fresh glycol. The decanting and replacement of the glycol were repeated twice more, at intervals of one hour, with continued heating at 120° C. The stirred vessel was then filled up with hot water, the mixture was stirred for one hour at 90° C., the water was decanted and the pigment paste was dried on a tray in a reduced-pressure oven at 100° C. and 1 mm Hg. 39 g of chemically pure flavanthrone, in a high-hiding pigmentary form which had excellent fastness to light, weathering and overcoating, were obtained.

EXAMPLE 15

400 g of crude C.I. Vat Yellow 20 (C.I. No. 68,420) were milled in a vibratory mill, like the crude pigment in Example 14a). 30 g of the milled product and 60 g of o-dichlorobenzene were worked into a paste in a 500 ml Erlenmeyer flask, using a glass rod. 60 g of glycol were added and the mixture was kept for 2 hours at 120° C., while being stirred occasionally with a magnetic stirrer. The glycol phase, which at that stage was reddish, was decanted and 100 g of fresh glycol were added. At intervals of 2 hours, at 120° C., the glycol phase was again decanted and replaced by fresh glycol until the glycol virtually no longer assumed a color, which was the case upon third treatment. The product was then worked up as described in Example 14. A yellow product in a particularly weathering-fast pigmentary form was obtained.

EXAMPLE 16

50 g of finely divided semi-chloro-copper phthalocyanine (prepared from o-phthalodinitrile and copper-I chloride by the baking process followed by milling for 36 hours in a ball mill with iron balls) were stirred with 50 g of ethylene glycol in a 500 ml Erlenmeyer flask for 30 minutes at 90° C. A mixture of 25 g of toluene and 25 g of monochlorobenzene was run in and stirring was continued at 90° C. After about 20 minutes, a pigment/aromatics paste had formed. After a further 30 minutes, the deep brownish yellow glycol phase could be detected. 50 g of fresh glycol were added and the washing process was repeated, as described in Example 4, as often as was necessary until the glycol which drained off was colorless. The paste was then poured onto a drying tray and dried at 100° C. and 1 mm Hg. 46 g of a deeply colored semi-chloro-copper phthalocyanine, containing about 60% of the α-modification, were obtained.

We claim:

1. In a process for the purification of a crude organic pigment by suspending it in a warm organic liquid and separating off the pigment, wherein the improvement comprises that the crude pigment selected from the series of pigments of phthalocyanines, quinophthalones, perylene-3,4,9,10-tetracarboxylic acid diimides and dioxazines is suspended in a mixture of (a) a polar hydrophilic organic liquid, the first liquid, which is miscible with water in all proportions and (b) a non-polar or polar organic liquid, the second liquid, which is immiscible with water and is partially or completely immiscible with the first liquid; wherein the suspension is mixed at 50°–180° C., the phases are allowed to separate, the phase, said first liquid, which contains the impurities is separated off and the purified pigment is isolated from the other phases, said second liquid.

2. A process as claimed in claim 1, wherein crude phthalocyanine is used.

3. A process as claimed in claim 1, wherein a mixture of (a) formic acid, ethylene glycol, diethylene glycol or glycerol, as the first liquid, and (b) benzene hydrocarbons, nitrobenzenes or chlorobenzenes, aliphatic or cycloaliphatic hydrocarbons or aliphatic chlorohydrocarbons or bromohydrocarbons, as the second liquid, is used.

4. A process as claimed in claim 1, wherein formic acid, ethylene glycol, glycerol or a mixture of these is used as the first liquid, and benzene, toluene, xylene, propylbenzene, butylbenzene, chlorobenzene, dichlorobenzene, trichlorobenzene, chlorotoluene, nitrobenzene, nitrotoluene, pentane, hexane, heptane, octane, petroleum ether, cyclohexane, chloroform, carbon tetrachloride, dichloroethane, dichloroethylene, trichloroethylene, dichloroethylene, tetrachloroethylene, 1,2-dibromoethane or a mixture of these is used as the second liquid.

5. A process as claimed in claim 1, wherein a mixture of ethylene glycol and xylene, tetrachloroethylene, trichloroethylene or 1,2-dibromoethane or a mixture of formic acid and xylene or tetrachloroethylene is used as the mixture of liquids which are partially or completely immiscible with one another.

6. A process as claimed in claim 1, wherein a mixture of ethylene glycol and xylene, tetrachloroethylene, trichloroethylene or 1,2-dibromoethane or a mixture of formic acid and xylene or tetrachloroethylene is used as the mixture of liquids which are partially or completely immiscible with one another.

7. A process as claimed in claim 2, wherein a mixture of ethylene glycol and xylene, tetrachloroethylene, trichloroethylene or 1,2-dibromoethane or a mixture of formic acid and xylene or tetrachloroethylene is used as the mixture of liquids which are partially or completely immiscible with one another.

8. A process as claimed in claim 1, wherein the weight ratio of first liquid to crude pigment is from 0.5 to 2 and the weight ratio of second liquid to crude pigment is from 0.5 to 5.

9. A process as claimed in claim 4, wherein the weight ratio of first liquid to crude pigment is from 0.5 to 2 and the weight ratio of second liquid to crude pigment is from 0.5 to 5.

10. A process as claimed in claim 5, wherein the weight ratio of first liquid to crude pigment is from 0.5 to 2 and the weight ratio of second liquid to crude pigment is from 0.5 to 5.

11. A process as claimed in claim 1, wherein the organic suspension of the crude pigment, as obtained from the process of synthesis, is used for the purification process, and the other liquid, which is partially or completely immiscible with the liquid present in the suspension, is added to the suspension.

12. A process as claimed in claim 1, wherein the organic suspension of the crude pigment, as obtained from the process of synthesis, is used for the purification process, the suspension is concentrated and the other liquid, which is partially or completely immiscible with the liquid present in the suspension, is added to the suspension.

13. A process as claimed in claim 1, wherein a finely divided crude pigment having a primary particle size of $\leq 0.1$ μm is used and, after separating off the first liquid containing the impurities, the finely divided crude pigment, still in the second liquid, is converted into the pigmentary form by heating and is then isolated, if desired.

14. A process as claimed in claim 13, wherein the crude pigment used is a finely divided agglomerated crude copper phthalocyanine which may contain up to 2 chlorine or bromine atoms in the molecule, a finely divided agglomerated polychloro-copper phthalocyanine or polybromochloro-copper phthalocyanine, the primary particle size of these crude pigments being $\leq 0.1$ μm.

15. A process as claimed in claim 11 or 12 or 13, wherein an organic suspension of crude copper phthalocyanine is used.

* * * * *